United States Patent
Jung et al.

(10) Patent No.: US 7,539,263 B2
(45) Date of Patent: May 26, 2009

(54) METHOD FOR TRANSMITTING AND RECEIVING PREAMBLE SEQUENCES IN AN ORTHOGONAL FREQUENCY DIVISION MULTIPLEXING COMMUNICATION SYSTEM USING A MULTIPLE INPUT MULTIPLE OUTPUT SCHEME

(75) Inventors: Young-Ho Jung, Seoul (KR); Jae-Hak Chung, Seoul (KR); Seung-Hoon Nam, Seoul (KR)

(73) Assignee: Samsung Electronics Co., Ltd (KR)

( * ) Notice: Subject to any disclaimer, the term of this patent is extended or adjusted under 35 U.S.C. 154(b) by 680 days.

(21) Appl. No.: 11/332,531

(22) Filed: Jan. 13, 2006

(65) Prior Publication Data

US 2006/0153282 A1   Jul. 13, 2006

(30) Foreign Application Priority Data

Jan. 13, 2005   (KR) ...................... 10-2005-0003464

(51) Int. Cl.
  *H04B 7/02*   (2006.01)
(52) U.S. Cl. ..................................... 375/267
(58) Field of Classification Search ................. 375/260, 375/267, 299, 343, 347, 354, 362, 364–368
See application file for complete search history.

(56) References Cited

U.S. PATENT DOCUMENTS

2003/0043887 A1 *   3/2003   Hudson ...................... 375/144
2006/0056528 A1 *   3/2006   Jung et al. .................. 375/260

* cited by examiner

*Primary Examiner*—Don N Vo
(74) *Attorney, Agent, or Firm*—The Farrell Law Firm, PC

(57) ABSTRACT

In an orthogonal frequency division multiplexing (OFDM) communication system using multiple transmit antennas, a first base sequence with a first length is segmented into a first number of second sequences to which different time offsets are applied. Subsequences of a first preamble sequence corresponding to the number of second sequences are generated. A second base sequence with a second length is segmented into a second number of third sequences to which different time offsets are applied. Subsequences of a second preamble sequence corresponding to the number of third sequences are generated. A subsequence is selected from the subsequences of the first preamble sequence and is transmitted through a transmit antenna in a first time interval. A third preset number of subsequences are selected from the subsequences of the second preamble sequence, and are mapped and transmitted to the transmit antennas in a second time interval.

13 Claims, 4 Drawing Sheets

METHOD FOR TRANSMITTING AND RECEIVING PREAMBLE SEQUENCES IN AN ORTHOGONAL FREQUENCY DIVISION MULTIPLEXING COMMUNICATION SYSTEM USING A MULTIPLE INPUT MULTIPLE OUTPUT SCHEME

This application claims priority under 35 U.S.C. § 119 to an application entitled "Method for Transmitting/Receiving Preamble Sequences in an Orthogonal Frequency Division Multiplexing Communication System Using a Multiple Input Multiple Output Scheme" filed in the Korean Intellectual Property Office on Jan. 13, 2005 and assigned Serial No. 2005-3464, the contents of which are incorporated herein by reference.

BACKGROUND OF THE INVENTION

1. Field of the Invention

The present invention generally relates to an orthogonal frequency division multiplexing (OFDM) communication system using a multiple input multiple output (MIMO) scheme, and more particularly, to a method for transmitting and receiving preamble sequences in the MIMO-OFDM communication system.

2. Description of the Related Art

A large amount of research is being conducted to provide users with services based on various qualities of service (QoS) at a high transmission rate in fourth-generation (4G) communication systems, which serve as next generation communication systems. In the current 4G-communication system, research is actively being conducted to support a high-speed service for ensuring mobility and QoS in broadband wireless access (BWA) communication systems such as wireless local area network (LAN) and wireless metropolitan area network (MAN) communication systems.

Research is also being conducted in an orthogonal frequency division multiplexing (OFDM) scheme useful to transmit high-speed data in a wired/wireless channel of the 4G-communication system. The OFDM scheme transmits data using a multicarrier, and is a type of multicarrier modulation (MCM) scheme for converting a serially input symbol stream to parallel signals, modulating the parallel signals into a plurality of orthogonal subcarriers, and transmitting the orthogonal subcarriers.

To provide high-speed and high-quality wireless multimedia services, the 4G-communication system needs broadband spectral resources. When the broadband spectral resources are used, the effect of fading due to multipath propagation is severe in a wireless transmission path and also the effect of frequency selective fading which occurs in a transmission band. When a high-speed wireless multimedia service is provided, the OFDM scheme robust to the frequency selective fading has a higher gain than a code division multiple access (CDMA) scheme. Therefore, the OFDM scheme is becoming actively exploited in the 4G-communication system.

A wireless communication system serving as a system for supporting a wireless communication service includes a base station (BS) and a mobile station (MS). The BS and the MS support the wireless communication service using a frame. Accordingly, the BS and the MS must acquire mutual synchronization for frame transmission and reception. For synchronization acquisition, the BS sends a synchronization signal to the MS such that the MS can know the start of the frame sent from the BS.

Then, the MS receives the synchronization signal from the BS, identifies frame timing of the BS, and demodulates a received frame on the basis of the identified frame timing. Conventionally, the synchronization signal uses a specific preamble sequence agreed to in advance between the BS and the MS.

The preamble sequence uses a low Peak to Average Power Ratio (PAPR) in the OFDM communication system. A preamble is used to perform synchronization acquisition, channel estimation, BS identification, and so on.

A preamble sequence with a low PAPR is used in the OFDM communication system. The reason for this will be described below.

Because the OFDM communication system serving as the multicarrier communication system uses a plurality of subcarriers, a transmitted signal is a sum of independent signals and therefore a difference between a maximum power value and a mean power value of time domain signal values is large. In the OFDM communication system, a PAPR value is large in a data interval and a linear interval of an amplifier provided in the OFDM system is defined on the basis of a maximum PAPR value in the data interval. Because a preamble can be transmitted at power increased by a difference with the maximum PAPR in the data interval when the PAPR of the preamble is set to a low value, the performance of channel estimation, synchronization acquisition, BS identification, and so on can be improved. Accordingly, it is important that the PAPR is lowered in the preamble interval.

When a signal transmitted from a transmitter is distorted while passing through a radio channel, a receiver receives the distorted transmitted signal. The receiver acquires time/frequency synchronization using a preamble sequence preset between the transmitter and the receiver. After channel estimation, the receiver demodulates a received signal corresponding to the distorted transmitted signal into frequency domain symbols through a fast Fourier transform (FFT). After demodulation into frequency domain symbols, the receiver decodes the frequency domain symbols into information/data through source decoding and channel decoding corresponding to channel coding applied in the transmitter.

The OFDM communication system uses a preamble sequence in all of frame timing synchronization, frequency synchronization, and channel estimation. Of course, the OFDM communication system may perform the frame timing synchronization, frequency synchronization, and channel estimation using a guard interval, a pilot subcarrier, and so on in addition to a preamble. In the case of the preamble sequence, the known symbols are transmitted in a start part of every frame or data burst. The preamble sequence is used to update estimated time/frequency/channel information through a guard interval and a pilot subcarrier of a data transmission part.

A preamble sequence and a preamble sequence generation method of the OFDM communication system using a multiple input multiple output (MIMO) scheme, i.e., multiple transmit antennas (Tx. ANTS) (e.g., $N_{TX}$ transmit antennas) and multiple receive antennas (Rx. ANTS) (e.g., $N_{RX}$ receive antennas) will be described with reference to FIG. 1, which schematically illustrates a preamble sequence mapping structure of a conventional OFDM communication system using the MIMO scheme.

FIG. 1 illustrates the preamble sequence mapping structure when BSs, for example, the first and second BSs (BS #1 and BS #2), configuring the OFDM communication system use the first and second transmit antennas (Tx. ANT #1 and Tx. ANT #2), respectively. As illustrated in FIG. 1, preamble sequences transmitted through the first and second transmit antennas of BS #1 are different from each other, and preamble sequences transmitted through the first and second transmit antennas of BS #2 are different from each other. The preamble sequences used in BS #1, i.e., the preamble sequences transmitted through the first and second transmit antennas of BS #1, are different from the preamble sequences used in BS #2, i.e., the preamble sequences transmitted through the first and second transmit antennas of BS #2.

In the cellular communication system serving as the OFDM communication system, an MS must be able to distinguish a plurality of cells. Conventionally, one BS can cover a plurality of cells. However, for convenience of explanation, it is assumed that one BS covers only one cell. As a result, the MS must be able to distinguish a plurality of BSs such that a target BS to which the MS belongs can be identified among the BSs configuring the OFDM communication system.

Accordingly, the OFDM communication system must allocate different preamble sequences between the BSs configuring the OFDM communication system and between the transmit antennas of the BSs. Each BS transmits the allocated preamble sequences through multiple transmit antennas, i.e., $N_{TX}$ transmit antennas. Because the different preamble sequences are transmitted through the transmit antennas of each BS as described above, an MS must have preamble sequences based on the number of transmit antennas provided in each BS. If the number of BSs configuring the OFDM communication system is M and the M BSs are provided with the $N_{TX}$ transmit antennas, respectively, the OFDM communication system must be provided with $M \times N_{TX}$ preamble sequences.

In this case, the OFDM communication system must generate the $M \times N_{TX}$ preamble sequences. When the preamble sequences with a preset length are generated, the OFDM communication system has a problem in that a maximum cross-correlation value between the preamble sequences and a PAPR increase as the number of preamble sequences increases.

Because an MS must be provided with $M \times N_{TX}$ correlators to distinguish the $M \times N_{TX}$ preamble sequences, the MS has a problem in that its hardware load increases. There is a problem in that a computation amount for distinguishing between BSs and synchronization acquisition using the correlators linearly increases according to the number of BSs and the number of transmit antennas.

SUMMARY OF THE INVENTION

It is, therefore, an object of the present invention to provide a method for transmitting and receiving preamble sequences in an orthogonal frequency division multiplexing (OFDM) communication system using a multiple input multiple output (MIMO) scheme.

It is another object of the present invention to provide a method for transmitting and receiving preamble sequences with a minimum Peak to Average Power Ratio (PAPR) in an orthogonal frequency division multiplexing (OFDM) communication system using a multiple input multiple output (MIMO) scheme.

It is another object of the present invention to provide a method for transmitting and receiving preamble sequences that can maximize the number of base stations (BSs) capable of being distinguished in an orthogonal frequency division multiplexing (OFDM) communication system using a multiple input multiple output (MIMO) scheme.

It is yet another object of the present invention to provide a method for transmitting and receiving preamble sequences that can correctly perform channel estimation in an orthogonal frequency division multiplexing (OFDM) communication system using a multiple input multiple output (MIMO) scheme.

In accordance with an aspect of the present invention, there is provided a method for transmitting preamble sequences from a transmitter in an orthogonal frequency division multiplexing (OFDM) communication system using multiple transmit antennas, including segmenting a first base sequence with a first preset length into a first preset number of second sequences; applying different time offsets to the second sequences and generating subsequences of a first preamble sequence corresponding to the number of second sequences; segmenting a second base sequence with a second preset length into a second preset number of third sequences; applying different time offsets to the third sequences and generating subsequences of a second preamble sequence corresponding to the number of third sequences; selecting a specific subsequence from the subsequences of the first preamble sequence and transmitting the specific subsequence through a specific transmit antenna of the multiple transmit antennas in a first preset time interval; and selecting a third preset number of subsequences from the subsequences of the second preamble sequence and mapping and transmitting the selected subsequences of the second preamble sequence to the multiple transmit antennas in a second preset time interval.

In accordance with another aspect of the present invention, there is provided a method for receiving preamble sequences in a receiver of an orthogonal frequency division multiplexing (OFDM) communication system, the OFDM communication system including at least one transmitter using multiple transmit antennas and the receiver using at least one receive antenna, the method including receiving a signal and correlating the received signal and a first preset number of subsequences of a first preamble sequence; acquiring synchronization with a transmitter to which the receiver belongs on a basis of a subsequence of the first preamble sequence with a maximum correlation value of correlation values between the received signal and the subsequences of the first preamble sequence; correlating the received signal and a second preset number of subsequences of a second preamble sequence; detecting a third preset number of correlation values from a maximum correlation value of correlation values between the received signal and the subsequences of the second preamble sequence; and identifying a transmitter to which the receiver belongs on a basis of subsequences of the second preamble sequence mapped to the detected correlation values.

BRIEF DESCRIPTION OF THE DRAWINGS

The above and other objects and advantages of the present invention will be more clearly understood from the following detailed description taken in conjunction with the accompanying drawings, in which.

DETAILED DESCRIPTION OF THE PREFERRED EMBODIMENTS

Figure 1:
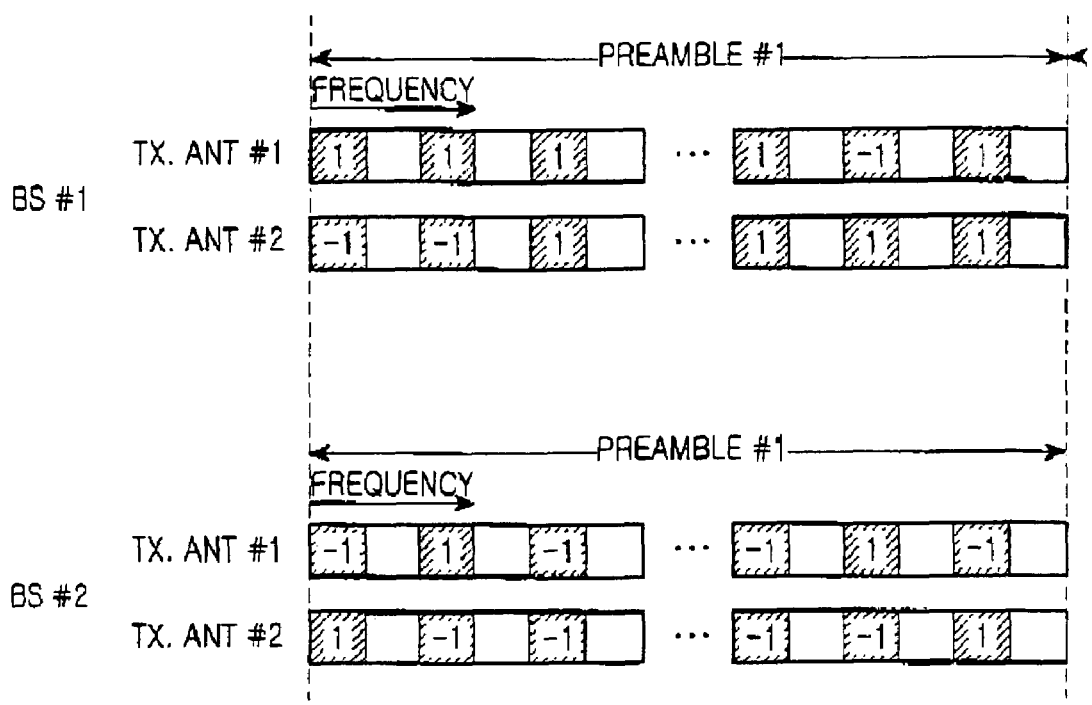
FIG. 1 schematically illustrates a preamble sequence mapping structure of a conventional orthogonal frequency division multiplexing (OFDM) communication system using a multiple input multiple output (MIMO) scheme.

Preferred embodiments of the present invention will be described in detail herein below with reference to the accompanying drawings. In the following description, only parts needed to understand the operation of the present invention will be described, and other parts are omitted for clarity and conciseness.

The present invention provides a method for transmitting and receiving preamble sequences in an orthogonal frequency division multiplexing (OFDM) communication system using a multiple input multiple output (MIMO) scheme. Specifically, the present invention provides the method for transmitting and receiving preamble sequences in the OFDM communication system using the MIMO scheme, i.e., multiple transmit antennas (Tx. ANTS) (e.g., $N_{TX}$ transmit antennas) and multiple receive antennas (Rx. ANTS) (e.g., $N_{RX}$ receive antennas). In the OFDM communication system, a preamble sequence to be transmitted through the first transmit antenna (Tx. ANT #1) is set to be different from a preamble sequence to be transmitted through other transmit antennas, i.e., the second to $N_{TX}$-th transmit antennas (Tx. ANT #2 to Tx. ANT # $N_{TX}$), except the first transmit antenna.

The OFDM communication system using the MIMO scheme (hereinafter, referred to as the MIMO-OFDM communication system) must generate a preamble sequence used for synchronization acquisition, channel estimation, and BS identification while considering the following points.

(1) Orthogonality must be maintained between multipath components of preamble sequences transmitted from transmit antennas of the MIMO-OFDM communication system such that the performance of channel estimation can be optimized.

(2) A cross-correlation must be minimized between preamble sequences allocated to BSs configuring the MIMO-OFDM communication system such that the performance of BS identification, i.e., BS detection, can be optimized.

(3) Auto-correlation characteristics of the preamble sequence itself must be excellent such that the performance of synchronization acquisition can be optimized.

(4) A low Peak to Average Power Ratio (PAPR) must be provided.

A linear interval of a power amplifier (PA) provided in the transmitter of the MIMO-OFDM communication system is designed on the basis of a maximum PAPR value in a data interval. Because a preamble can be transmitted at power increased by a difference with the maximum PAPR in the data interval when the PAPR of the preamble is set to a low value, the performance of channel estimation, synchronization acquisition, BS identification, and so on can be improved. Accordingly, it is important that the PAPR is lowered in the preamble interval.

(5) The number of preamble sequences must be minimized such that not only the synchronization acquisition performance can be optimized, but also an amount of computation of the receiver can be minimized.

In the present invention considering the above-described points, preamble sequences are transmitted and received in which the preamble sequence to be transmitted through the first transmit antenna is set to be different from the preamble sequence to be transmitted through other transmit antennas, i.e., the second to $N_{TX}$-th transmit antennas. Here, the preamble sequence transmitted through the first transmit antenna is referred to as the first preamble sequence (Preamble Sequence #1) and the preamble sequence transmitted through the first to $N_{TX}$-th transmit antennas is referred to as the second preamble sequence (Preamble Sequence #2).

A preamble sequence structure of the MIMO-OFDM communication system in accordance with the present invention will be described with reference to FIG. 2.

Figure 2:
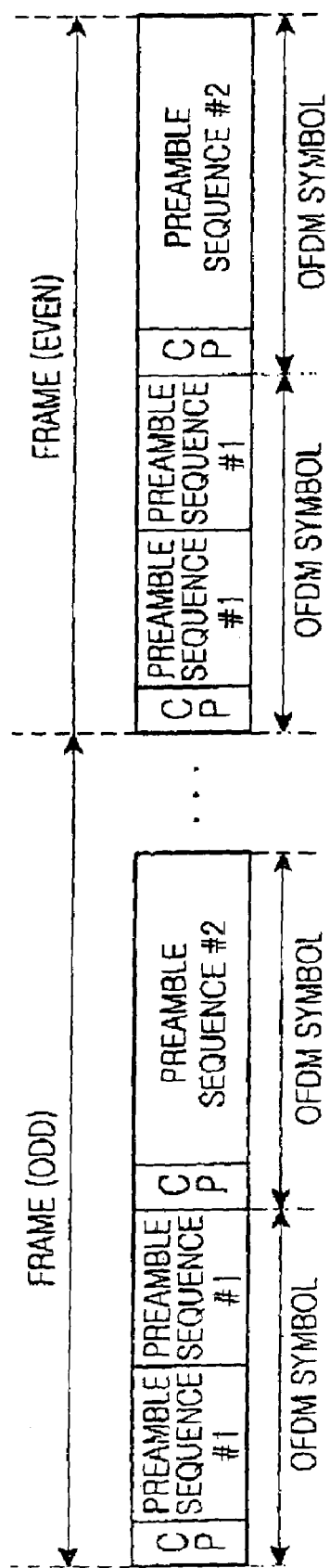
FIG. 2 schematically illustrates a preamble sequence structure of a MIMO-OFDM communication system in accordance with an embodiment of the present invention.

Referring to FIG. 2, the preamble sequence structure of the present invention is a structure in which the first and second preamble sequences are combined as described above. The first preamble sequence is transmitted through the first transmit antenna, and the second preamble sequence is transmitted through the first to $N_{TX}$-th transmit antennas. The first preamble sequence is used to estimate a frequency offset, acquire frame synchronization, send cell-specific information of an associated BS or cell, and estimate a sequence set used in a transmission interval of the second preamble sequence. The cell-specific information will be described below.

Now, the first preamble sequence will be described as follows.

The MIMO-OFDM communication system is provided with $N_{group}$ first base sequences to generate first preamble sequences. Here, the first base sequences use a sequence with excellent auto-correlation characteristics, for example, a Constant Amplitude Zero Auto-Correlation (CAZAC) sequence or a Zero Auto-Correlation (ZAC) sequence. The reason why the first base sequences use the sequence with the excellent auto-correlation characteristics is as follows.

A PAPR of the CAZAC sequence is 0 [dB] because the amplitude of the CAZAC sequence is constant, and a PAPR of the ZAC sequence is less than 3 [dB]. That is, the CAZAC sequence is an optimal sequence in terms of the PAPR. When a time difference between an associated CAZAC sequence and an arbitrary CAZAC sequence is 0, that is, the associated CAZAC sequence correctly matches the arbitrary CAZAC sequence without the time difference, an auto-correlation value becomes a peak value. As a result, the sequence detection performance is optimal because the auto-correlation value becomes 0 when the CAZAC sequence is incorrectly synchronized. Multiple (i.e., $N_{group}$) first base sequences use multiple (i.e., $N_{group}$) sequences with a minimum cross-correlation value retrieved from CAZAC sequences with an associated length. Neighbor BSs allocate different first base sequences and therefore cross-interference is minimized.

For convenience of explanation, an example of generating the first base sequence using the CAZAC sequence will be described herein. A first preamble sequence structure of the MIMO-OFDM communication system in accordance with the present invention will be described with reference to FIG. 3.

A set of first preamble sequences in accordance with the present invention is configured by cyclic shift transpose sequences with different time offsets in the first base sequence of the length N, i.e., a CAZAC sequence $c=[c_1 c_2 \ldots c_{N-1} c_N]^T$. That is, the CAZAC sequence $c=[c_1 c_2 \ldots c_{N-1} c_N]^T$ is segmented into $N_{pre1}$ CAZAC subsequences, i.e., subsequences of the first preamble sequence. The arbitrary i-th CAZAC subsequence $c_i$, i.e., the i-th preamble subsequence of the first preamble sequence, among the $N_{pre1}$ CAZAC subsequences, is defined as shown in Equation (1).

$$c_i = \left[ c_{\frac{(i-1)N}{N_{pre1}}+1} \quad c_{\frac{(i-1)N}{N_{pre1}}+2} \quad \cdots \quad c_{\frac{iN}{N_{pre1}}-1} \quad c_{\frac{iN}{N_{pre1}}} \right]^T \quad \text{Equation (1)}$$

The $N_{pre1}$ CAZAC subsequences are shifted in the form of having different time offsets, such that $N_{pre1}$ preamble subsequences of the first preamble sequence are generated. Here, the length of the i-th CAZAC subsequence $c_i$, i.e., the i-th preamble subsequence of the first preamble sequence, is $$\frac{N}{N_{pre1}},$$

and is set to be greater than or equal to the number of maximum delay samples, i.e., the maximum length of channel delay spread, $L_{max}$, such that a cross-correlation between preamble sequences is prevented.

In an embodiment of the present invention, it is assumed that the length N of the first preamble sequence corresponds to 512 samples and $N_{pre1}$ is 4. As described above, $N_{group}$ BSs can generate $N_{pre1}$ subsequences of the first preamble sequence using a different first base sequence, respectively. A subsequence of the first preamble sequence is selected from the $N_{pre1}$ generated subsequences of the first preamble sequence and the selected subsequence of the first preamble sequence is transmitted through the first transmit antenna.

When a subsequence of the first preamble sequence is selected from the generated $N_{pre1}$ subsequences of the first preamble sequence and the selected subsequence of the first preamble sequence is transmitted through the first transmit antenna, each BS can map cell-specific information to a subsequence index of the first preamble sequence to be transmitted through the first transmit antenna. The cell-specific information is specific information managed in an associated cell or BS. That is, the specific information may be a ratio between an uplink and downlink per frame when the BS uses a Time Division Duplex (TDD) scheme. The specific information is shown in Table 1.

TABLE 1

| Preamble sequence #1-subsequence index | Number of uplink symbols | Number of downlink symbols |
| --- | --- | --- |
| 1 | 2 | 8 |
| 2 | 4 | 6 |
| 3 | 6 | 4 |
| 4 | 8 | 2 |

When a subsequence index of the first preamble sequence is 1 and the number of symbols configuring the frame is 10, the number of uplink symbols is 2 and the number of downlink symbols is 8. Table 1 shows the number of uplink symbols and the number of downlink symbols mapped to a subsequence index of the first preamble sequence. Of course, other cell-specific information can be indicated.

Figure 3:
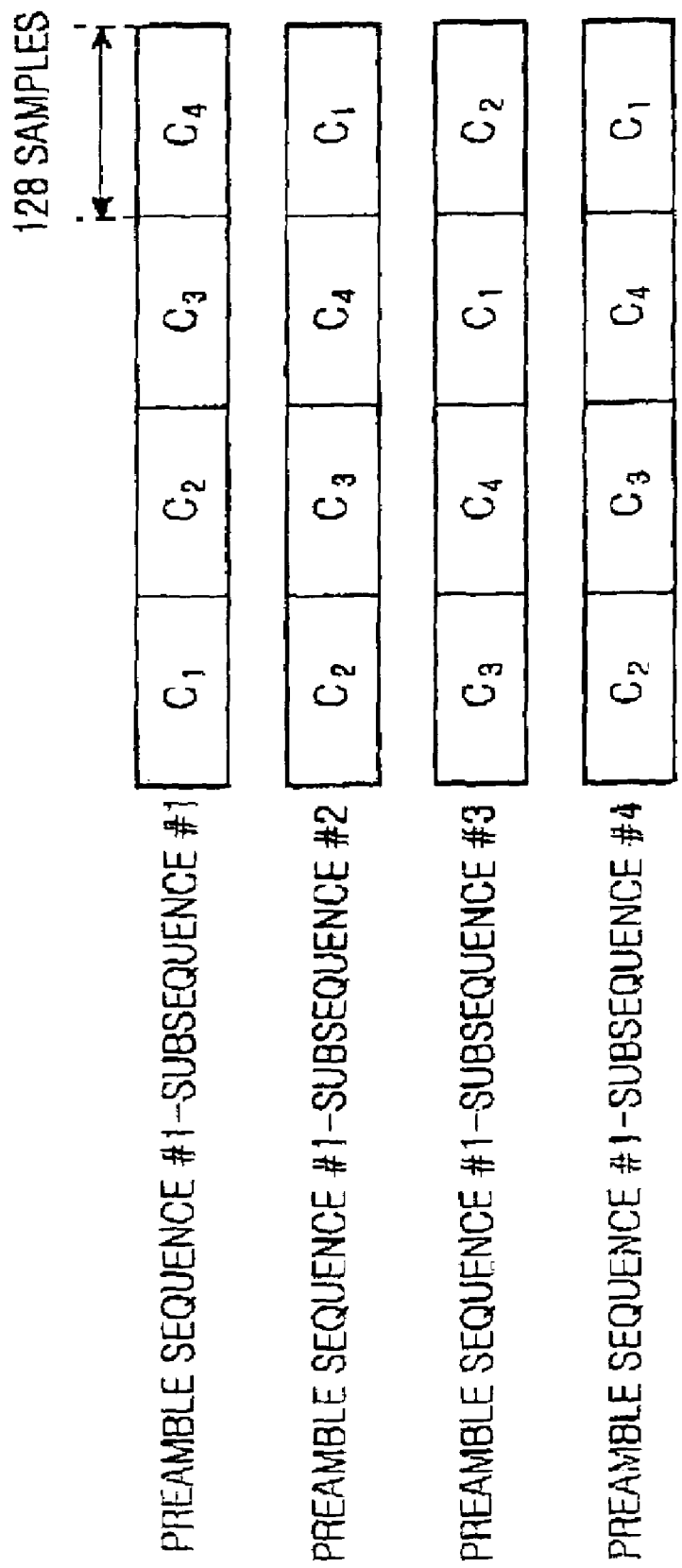
FIG. 3 schematically illustrates a first preamble sequence structure of the MIMO-OFDM communication system in accordance with an embodiment of the present invention.
Figure 4:
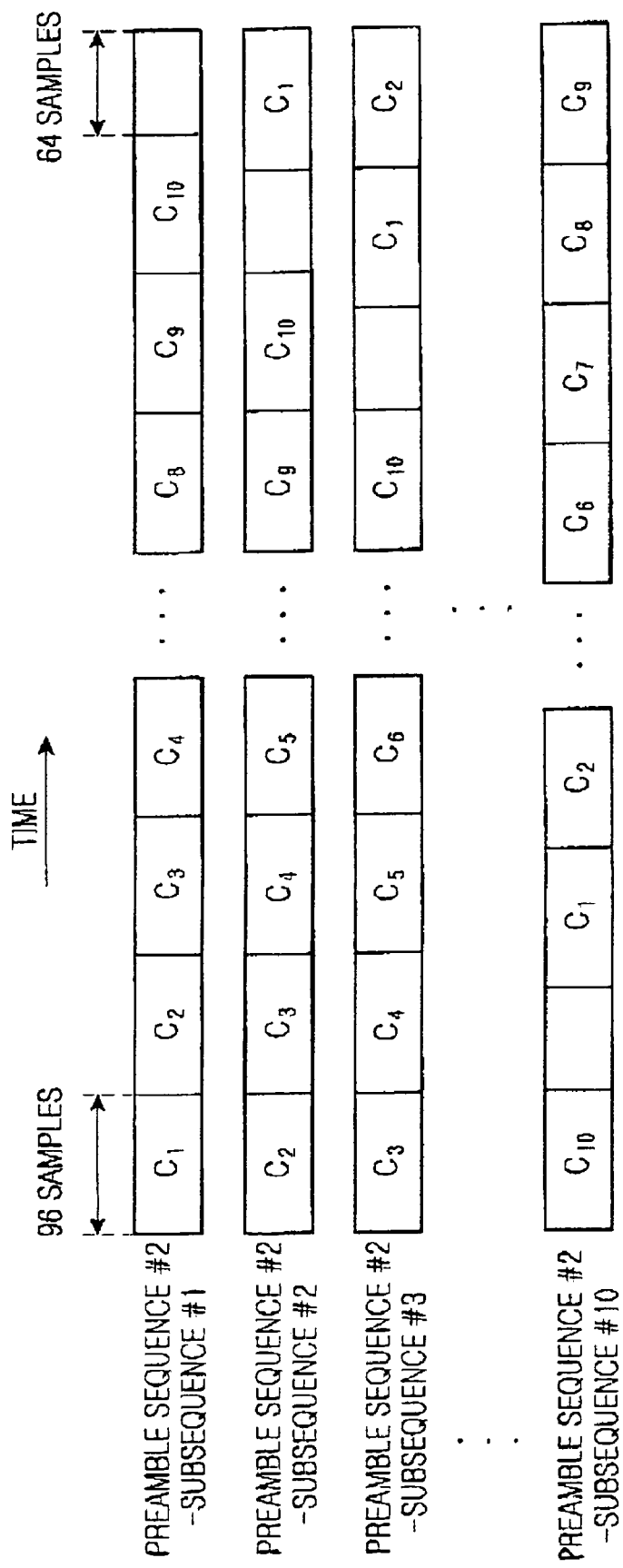
FIG. 4 schematically illustrates a second preamble sequence structure of the MIMO-OFDM communication system in accordance with an embodiment of the present invention.

The first preamble sequence structure of the MIMO-OFDM communication system in accordance with the present invention has been described with reference to FIG. 3. Next, a second preamble sequence structure of the MIMO-OFDM communication system in accordance with an embodiment of the present invention will be described with reference to FIG. 4.

A set of second preamble sequences in accordance with the present invention is configured by cyclic shift transpose sequences with different time offsets in the second base sequence of the length N, i.e., a CAZAC sequence $c=[c_1 c_2 \ldots c_{N-1} c_N]^T$. That is, the CAZAC sequence $c=[c_1 c_2 \ldots c_{N-1} c_N]^T$ is segmented into $N_{pre2}$ CAZAC subsequences, i.e., subsequences of the second preamble sequence. The arbitrary i-th CAZAC subsequence $c_i$, i.e., the i-th preamble subsequence of the second preamble sequence, among the $N_{pre2}$ CAZAC subsequences, is defined as shown in Equation (2).

$$c_i = \left[ c_{\frac{(i-1)N}{N_{pre2}}+1} \quad c_{\frac{(i-1)N}{N_{pre2}}+2} \quad \cdots \quad c_{\frac{iN}{N_{pre2}}-1} \quad c_{\frac{iN}{N_{pre2}}} \right]^T \quad \text{Equation (2)}$$

The $N_{pre2}$ CAZAC subsequences are shifted in the form of having different time offsets, such that $N_{pre2}$ preamble subsequences of the second preamble sequence are generated. Here, the length of the i-th CAZAC subsequence $c_i$, i.e., the i-th preamble subsequence of the second preamble sequence, is $$\frac{N}{N_{pre2}},$$

and is set to be greater than or equal to the number of maximum delay samples, i.e., the maximum length of channel delay spread, $L_{max}$, such that a cross-correlation between preamble sequences is prevented.

In an embodiment of the present invention, it is assumed that the length of the second preamble sequence corresponds to 1,024 samples and $N_{pre2}$ is 10. As described above, $N_{group}$ BSs can generate $N_{pre2}$ subsequences of the second preamble sequence using a different second base sequence, respectively. $N_{TX}$ subsequences of the second preamble sequence corresponding to the number of transmit antennas are selected from the $N_{pre2}$ generated subsequences of the second preamble sequence and are transmitted through the first to $N_{TX}$-th transmit antennas.

When each BS selects the $N_{TX}$ subsequences of the second preamble sequence from the $N_{pre2}$ generated subsequences of the second preamble sequence and transmits through the first to $N_{TX}$-th transmit antennas as described above, a BS identifier (ID) is defined by a combination of subsequence indices of the second preamble sequence to be transmitted through the second to $N_{TX}$-th transmit antennas.

The $N_{TX}$ subsequences of the second preamble sequence are selected from the $N_{pre2}$ generated subsequences of the second preamble sequence and are transmitted through the first to $N_{TX}$-th transmit antennas. Alternatively, the $N_{TX}$ subsequences of the second preamble sequence may be transmitted through some transmit antennas of the $N_{TX}$ transmit antennas. This case will be described below.

Preamble sequences, i.e., subsequences of the second preamble sequence, selected to indicate BS IDs in the BSs configuring the MIMO-OFDM communication system are different from each other. That is, the BSs configuring the MIMO-OFDM communication system use subsequences of the second preambles sequences differently from each other, such that orthogonality can be maintained between the transmit antennas and also between the BSs. Because the preamble sequence uses the CAZAC sequence, PAPR characteristics are excellent.

Next, there will be described in more detail the case where the $N_{TX}$ subsequences of the second preamble sequence are selected from the $N_{pre2}$ generated subsequences of the second preamble sequence and are transmitted using only some transmit antennas of the $N_{TX}$ transmit antennas without using all the first to $N_{TX}$-th transmit antennas.

It is assumed that fixed subsequences of the second preamble sequence are transmitted through m transmit antennas of the $N_{TX}$ transmit antennas used in an arbitrary BS of the MIMO-OFDM communication system, where $N_{TX}$ is 4, m is 2, and $N_{pre2}$ is 10.

The fixed subsequences of the second preamble sequence are transmitted through the third and fourth transmit antennas of the first to fourth transmit antennas. The ninth subsequence of the second preamble sequence is transmitted through the third transmit antenna. The tenth subsequence of the second preamble sequence is transmitted through the fourth transmit antenna. Different subsequences of the second preamble sequence are transmitted through the remaining transmit antennas, i.e., the first and second transmit antennas, except the third and fourth transmit antennas. $N_{group-m}C_{N_{TX}-m}$ subsequence combinations of the second preamble sequence are generated in total. Here, a combination of subsequences of the second preamble sequence to be transmitted through the first and second transmit antennas indicates a BS ID and is referred to as $ID_{pre}$. Next, an operation for allocating $ID_{pre}$ corresponding to the BS ID will be described with reference to Table 2.

TABLE 2

| $ID_{pre}$ | TX. ANT #1 | TX. ANT #2 |
|---|---|---|
| 1 | Preamble sequence #2-subsequence #1 | Preamble sequence #2-subsequence #2 |
| 2 | Preamble sequence #2-subsequence #1 | Preamble sequence #2-subsequence #3 |
| 3 | Preamble sequence #2-Subsequence #1 | Preamble sequence #2-subsequence #4 |
| 4 | Preamble sequence #2-subsequence #2 | Preamble sequence #2-subsequence #3 |
| 5 | Preamble sequence #2-subsequence #2 | Preamble sequence #2-subsequence #4 |
| 6 | Preamble sequence #2-subsequence #2 | Preamble sequence #2-subsequence #4 |

Assuming that the number of subsequences of the second preamble sequence is 6, the BS uses 4 transmit antennas, and fixed subsequences of the second preamble sequence, i.e., the fifth and sixth subsequences of the second preamble sequence, are transmitted through two transmit antennas, i.e., the third and fourth transmit antennas as shown in Table 2, six BSs can be distinguished using one second base sequence.

On the other hand, the second preamble sequence as described above is repeated multiple times and a combination of the second preamble sequences to be transmitted through, for example, odd and even frames, can indicate a BS ID. In this case, a maximum of $$\frac{(N_{group-m}C_{N_{TX}-m})(N_{group-m}C_{N_{TX}-m}+1)}{2}$$

BSs can be distinguished. Assuming that the fixed subsequences of the second preamble sequence are transmitted through two transmit antennas of four transmit antennas used in one arbitrary BS of the MIMO-OFDM communication system as shown in Table 2, BS IDs can be transmitted as shown in Table 3.

TABLE 3

| Cell_ID | ID_1 | ID_2 | ID_pre | ID_1 | ID_2 |
|---|---|---|---|---|---|
| 1 | 1 | 1 | 12 | 3 | 3 |
| 2 | 1 | 2 | 13 | 3 | 4 |
| 3 | 1 | 3 | 14 | 3 | 5 |
| 4 | 1 | 4 | 15 | 3 | 6 |
| 5 | 1 | 5 | 16 | 4 | 4 |
| 6 | 1 | 6 | 17 | 4 | 5 |
| 7 | 2 | 2 | 18 | 4 | 6 |
| 8 | 2 | 3 | 19 | 5 | 5 |
| 9 | 2 | 4 | 20 | 5 | 6 |
| 10 | 2 | 5 | 21 | 6 | 6 |
| 11 | 2 | 6 | | | |

In Table 3, Cell_ID denotes a BS ID, ID_1 denotes a combination of subsequences of the second preamble sequence corresponding to ID re generated in the odd frame, and ID_2 denotes a combination of subsequences of the second preamble sequence corresponding to ID_pre generated in the even frame.

Next, an operation for performing synchronization acquisition, BS identification, and channel estimation using the first and second preamble sequences as described above will be described in the following.

In the MIMO-OFDM communication system, both a transmitter (e.g., a BS) and a receiver (e.g., a user terminal) use a preamble sequence such that synchronization acquisition, BS identification, and channel estimation can be performed. Of course, the MIMO-OFDM communication system can also perform the synchronization acquisition and channel estimation using a guard interval signal and a pilot signal in addition to the preamble sequence. Here, the guard interval signal is inserted using a cyclic prefix scheme in which the last predetermined samples of a time domain OFDM symbol are copied and inserted into an effective OFDM symbol or a cyclic postfix scheme in which the first predetermined samples of a time domain OFDM symbol are copied and inserted into an effective OFDM symbol. Here, the predetermined samples of the cyclic prefix scheme and the cyclic postfix scheme are preset by a size based on a situation of the OFDM communication system. The guard interval signal can be used to acquire time/frequency synchronization of an OFDM symbol received by the receiver using a form in which a part of one OFDM symbol of the time domain, i.e., the first or last part of the one OFDM symbol, is copied and repeatedly placed.

The preamble sequence is transmitted in the start part of every frame or data burst on the basis of a mutually agreed sequence form. In this case, the preamble sequence is used to update estimated synchronization and channel information using information of a guard interval and a pilot signal in a data transmission part.

An order of the operations of the synchronization acquisition, BS identification, and channel estimation in the MIMO-OFDM communication system is not specially defined, but the operation efficiency is maximized when the operations are performed in the following order.

(1) Frequency offset and OFDM symbol synchronization acquisition using a guard interval;

(2) Frame synchronization acquisition using a preamble sequence;

(3) BS identification using a preamble sequence;

(4) (Optional) Precise adjustment of a frequency offset using a preamble sequence; and (5) Channel estimation using a preamble sequence.

The remaining operations except for the synchronization acquisition and BS identification operations are the same as those of the conventional MIMO-OFDM communication system. Only the synchronization acquisition and BS identification operations of the present invention are differentiated from those of the conventional MIMO-OFDM communication system. In accordance with the present invention, a user terminal of the MIMO-OFDM communication system computes correlation values between a received signal and $N_{pre1}$ subsequences of the first preamble sequence to identify synchronization and cell-specific information of a BS to which the user terminal belongs. The user terminal selects the largest correlation value from the computed correlation values, and acquires synchronization and the cell-specific information from the subsequence of the first preamble sequence with the largest correlation value.

In the present invention, the user terminal computes correlation values between a received signal and $N_{pre2}$ subsequences of the second preamble sequence to identify a BS to which the user terminal belongs. The user terminal sequentially selects n correlation values from the selected correlation values in descending order. The user terminal detects the subsequences of the second preamble sequence mapped to the n correlation values from preamble sequences transmitted from the BS to which the user terminal belongs.

An ID of the BS to which the user terminal belongs is determined by a combination of the n subsequences of the second preamble sequence mapped to the n detected correlation values.

As is apparent from the above description, the present invention can distinguish a large number of base stations (BSs) in a multiple input multiple output (MIMO)-orthogonal frequency division multiplexing (OFDM) communication system using multiple transmit antennas, optimize MIMO-based antenna channel estimation, and generate a preamble sequence of a minimum Peak to Average Power Ratio (PAPR) capable of sending cell-specific information. The generation of the preamble sequence of the minimum PAPR can improve the overall performance of the MIMO-OFDM communication system. Moreover, the present invention transmits preamble sequences through the multiple transmit antennas, thereby identifying a BS through relatively simple computation and performing correct channel estimation in the MIMO-OFDM communication system.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for transmitting preamble sequences from a transmitter in an orthogonal frequency division multiplexing (OFDM) communication system using multiple transmit antennas, comprising the steps of:
   segmenting a first base sequence with a first preset length into a first preset number of second sequences;
   applying different time offsets to the second sequences and generating subsequences of a first preamble sequence corresponding to the number of second sequences;
   segmenting a second base sequence with a second preset length into a second preset number of third sequences;
   applying different time offsets to the third sequences and generating subsequences of a second preamble sequence corresponding to the number of third sequences;
   selecting a specific subsequence from the subsequences of the first preamble sequence and transmitting the specific subsequence through a specific transmit antenna of the multiple transmit antennas in a first preset time interval; and
   selecting a third preset number of subsequences from the subsequences of the second preamble sequence, and mapping and transmitting the selected subsequences of the second preamble sequence to the multiple transmit antennas in a second preset time interval.

2. The method of claim 1, wherein the third preset number is equal to the number of transmit antennas.

3. The method of claim 2, wherein the step of mapping and transmitting the selected subsequences of the second preamble sequence to the multiple transmit antennas comprises:
   mapping and transmitting the selected subsequences of the second preamble sequence to the multiple transmit antennas on a one-to-one basis.

4. The method of claim 1, wherein the third preset number is less than the number of transmit antennas.

5. The method of claim 4, wherein the step of mapping and transmitting the selected subsequences of the second preamble sequence to the multiple transmit antennas comprises:
   mapping and transmitting the selected subsequences of the second preamble sequence to transmit antennas corresponding to the third preset number on a one-to-one basis; and
   mapping and transmitting preset subsequences of the second preamble sequence to other transmit antennas, except the transmit antennas corresponding to the third preset number, on the one-to-one basis.

6. The method of claim 5, wherein the first base sequence is a Constant Amplitude Zero Auto-Correlation (CAZAC) sequence or a Zero Auto-Correlation (ZAC) sequence.

7. The method of claim 3, wherein the second base sequence is one of a Constant Amplitude Zero Auto-Correlation (CAZAC) sequence and a Zero Auto-Correlation (ZAC) sequence.

8. The method of claim 5, wherein the first base sequence is a Constant Amplitude Zero Auto-Correlation (CAZAC) sequence or a Zero Auto-Correlation (ZAC) sequence.

9. A method for receiving preamble sequences in a receiver of an orthogonal frequency division multiplexing (OFDM) communication system, the OFDM communication system having at least one transmitter using multiple transmit antennas and the receiver using at least one receive antenna, the method comprising the steps of:
   receiving a signal and correlating the received signal and a first preset number of subsequences of a first preamble sequence;
   acquiring synchronization with a transmitter to which the receiver belongs on a basis of a subsequence of the first preamble sequence with a maximum correlation value of correlation values between the received signal and the subsequences of the first preamble sequence;
   correlating the received signal and a second preset number of subsequences of a second preamble sequence;
   detecting a third preset number of correlation values from a maximum correlation value of correlation values between the received signal and the subsequences of the second preamble sequence; and
   identifying a transmitter to which the receiver belongs on a basis of subsequences of the second preamble sequence mapped to the detected correlation values.

10. The method of claim 9, wherein the subsequences of the first preamble sequence corresponding to the number of second sequences are generated when a first base sequence with a first preset length is segmented into a first preset number of second sequences and different time offsets are applied to the second sequences.

11. The method of claim 10, wherein the first base sequence is one of a Constant Amplitude Zero Auto-Correlation (CAZAC) sequence and a Zero Auto-Correlation (ZAC) sequence.

12. The method of claim 9, wherein the subsequences of the second preamble sequence corresponding to the number of third sequences are generated when a second base sequence with a second preset length is segmented into a second preset number of third sequences and different time offsets are applied to the third sequences.

13. The method of claim 12, wherein the second base sequence is one of a Constant Amplitude Zero Auto-Correlation (CAZAC) sequence and a Zero Auto-Correlation (ZAC) sequence.

* * * * *